June 16, 1959 E. O. KEIZER 2,891,105

AUTOMATIC FREQUENCY CONTROL APPARATUS

Filed Sept. 23, 1953 2 Sheets-Sheet 1

INVENTOR.

Eugene O. Keizer

BY [signature]

ATTORNEY

June 16, 1959 E. O. KEIZER 2,891,105

AUTOMATIC FREQUENCY CONTROL APPARATUS

Filed Sept. 23, 1953 2 Sheets-Sheet 2

INVENTOR.

Eugene O. Keizer

BY [signature]

ATTORNEY

United States Patent Office 2,891,105
Patented June 16, 1959

2,891,105

AUTOMATIC FREQUENCY CONTROL APPARATUS

Eugene Orville Keizer, Princeton, N.J., assignor to Radio Corporation of America, a corporation of Delaware Application September 23, 1953, Serial No. 381,950
2 Claims. (Cl. 178—5.8)

The present invention relates to new and improved automatic frequency control (AFC) apparatus.

More particularly, although not necessarily exclusively, the invention relates to apparatus for maintaining substantially constant the tuning of a local oscillator in a superheterodyne receiver and is particularly well suited for use in conjunction with a television receiver of the "intercarrier sound" variety.

As described in detail in U.S. Patent No. 2,448,908, granted September 7, 1948, to L. W. Parker, intercarrier sound receivers make use of the fact that, according to present day television standards, the video information and sound information are transmitted by amplitude- and frequency-modulation, respectively, of carrier waves whose center frequencies are separated by a fixed amount such as 4.5 mc. Thus, in a superheterodyne intercarrier sound receiver the video and sound carrier waves are heterodyned with the output of a local oscillator to produce corresponding intermediate frequency (IF) waves which are similarly separated by 4.5 mc. The two IF waves are then heterodyned with each other in the receiver's second or video detector to produce a beat frequency of 4.5 mc. which is taken off and, after amplification in one or more sound IF stages, demodulated in a ratio detector, for example.

While one advantage of intercarrier sound is the relative latitude which it affords for frequency drift, some form of automatic frequency control is often desirable, particularly in the case of ultra high frequency television. As is well known, there have been various proposals for AFC systems including that described and claimed in the copending U.S. patent application of Gordon F. Rogers, Serial No. 173,981, filed July 15, 1950. In the Rogers application, for example, there is described an AFC system for use with an intercarrier sound receiver in which the beat frequency between the video and sound IF waves produced in the second detector is applied to a frequency multiplier whose output is measured with one of the original IF waves and applied to a frequency discriminator which produces a control voltage for varying a reactance tube in proper manner to control the frequency of the receiver's local oscillator.

The present invention has as a primary object that of providing simplified means for affording automatic frequency control in a television receiver of the intercarrier sound type.

Another object of the invention is to provide automatic frequency control means for a television receiver of the type described, which means utilizes advantageously certain signals developed within the conventional circuitry existing in present day receivers.

In general, the present invention contemplates the provision of automatic frequency control for the local oscillator of an intercarrier sound television receiver utilizing the signal available at the control electrode of a sound IF amplifier. More particularly, it has been found that, as the fine tuning of such a receiver is varied, the grid current of the sound IF stage varies proportionately, thereby affording a locally generated indication of the degree of mistuning. This signal is, in accordance with one embodiment of the invention, applied to a suitable frequency control circuit for the local oscillator, such as a reactance tube, for example.

According to another form of the invention, the control signal for the oscillator frequency control means is derived from a point in the ratio detector sound-demodulating circuit, at which point the circuit is also substantially solely responsive to changes in incoming signal strength rather than to frequency. This latter form of the invention is, as will be more fully apparent hereinafter, quite distinct from the use of well known frequency discriminators as the means for developing a frequency control signal dependent upon variation in frequency.

Additional objects and advantages of the present invention will become apparent to persons skilled in the art from a study of the following detailed description of the accompanying drawing, in which.

Figure 1:
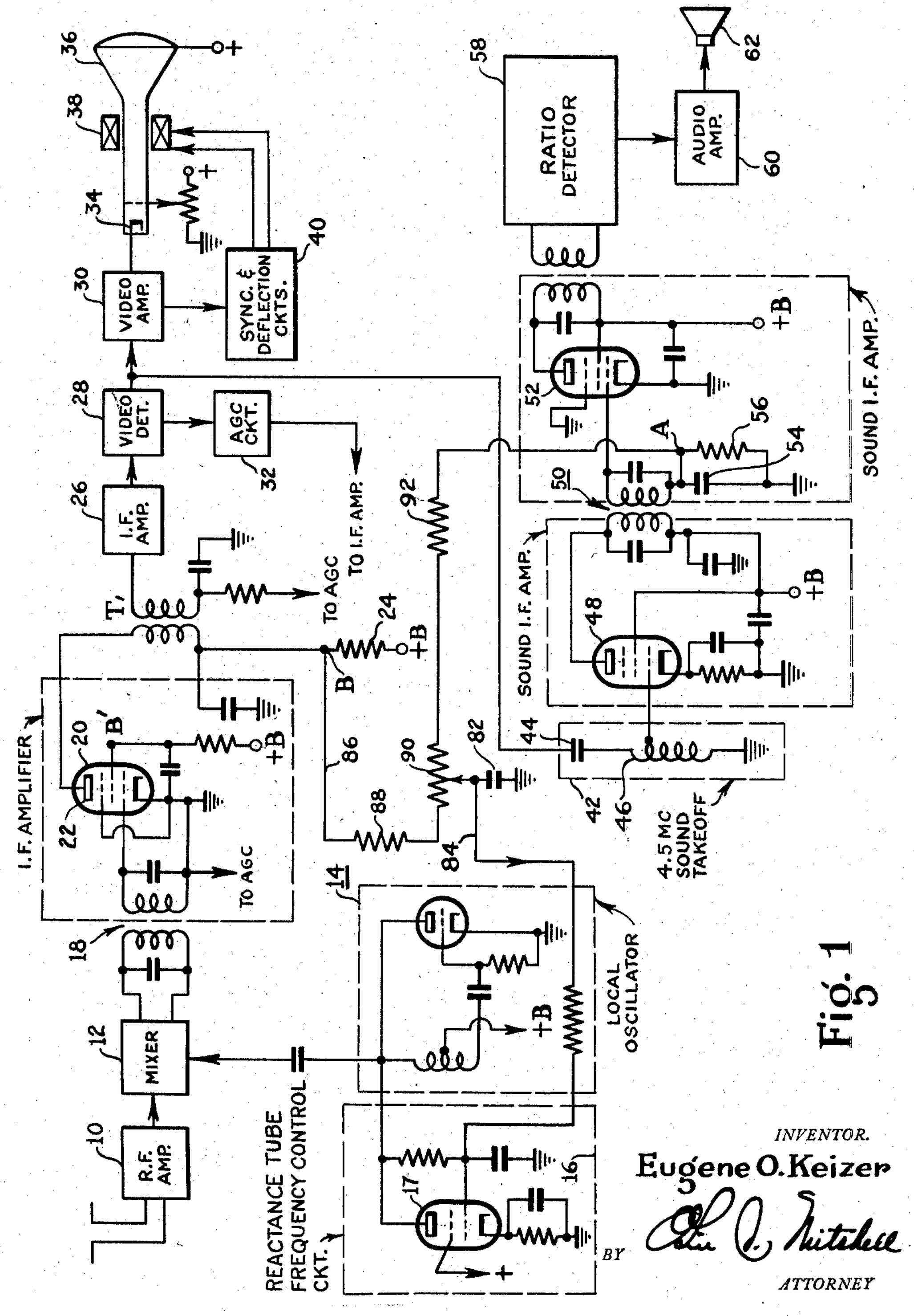
Figure 1 illustrates, by way of block and schematic diagram, an intercarrier sound television receiver embodying the principles of the present invention according to one of its forms.

Referring to the drawing, and more particularly to Figure 1 thereof, the composite television signal including a video carrier which is amplitude modulated in accordance with picture information and a frequency modulated sound carrier is applied to a radio frequency (RF) amplifier 10 whose output is, in turn, applied to a conventional first detector or mixer 12. Within mixer 12, the video and sound carrier waves are heterodyned with a wave produced by a local oscillator 14 whose frequency of oscillation is maintained by suitable frequency control means 16 illustrated as a reactance tube circuit of well known form.

The resultant IF carrier waves are coupled by means of a double-tuned circuit 18 to the control electrode of a video or "common" IF amplifier 20 which is, as shown, of conventional design. The anode 22 of the IF amplifier is illustrated as being connected through the primary of transformer $T_1$ and resistor 24 to a source of positive operating potential "+B." The secondary of transformer $T_1$, in turn, couples the amplified IF waves to an additional IF amplifier 26 whose output is applied to the video detector 28 where the following functions are carried out: First, the picture information is effectively removed by amplitude-demodulation of the video carrier wave and applied to the video amplifier 30. Second, in accordance with well known principles, the amplitude of the synchronizing pulses forming a part of the composite received signal is or may be measured to derive a suitable automatic gain control (AGC) signal by conventional means indicated as block 32. The AGC circuit 32 is or may be coupled to the control electrodes of the IF amplifiers 20 and 26, for example, for the purpose of varying the bias on the amplifiers generally in proportion to the strength of the received signal, whereby to increase the gain of amplifiers when a weaker signal than normal is received. Finally, the non-linear characteristic of the video detector 28 serves, as explained in the above cited Parker patent, to heterodyne the two IF waves in such manner that a 4.5 mc. beat note with frequency modulation components is produced.

Merely for purposes of completeness of description, it may be noted that the output of the video amplifier is coupled to a conduction controlling electrode 34 of an image reproducing kinescope 36 whose electron beam is caused to scan a raster by means of suitable sawtooth currents applied to its electromagnetic deflection coils 38 as by means of deflection circuits 40 which are maintained in synchronism with the transmitter through the usual horizontal and vertical synchronizing pulses.

The 4.5 mc. beat produced by the video detector 28 is selected by a resonant "sound takeoff" circuit 42 comprising capacitor 44 and inductance 46 which are tuned to that frequency. The beat note is then applied to the control electrode of a sound IF amplifier 48 whose output is applied, via the double-tuned circuit 50, to the control electrode of a final sound IF amplifier 52 which is of conventional design and includes, in its control electrode circuit, a capacitor 54 and shunt resistor 56 as a grid return path to ground. The ratio detector, as will be described more fully hereinafter, performs the function of detecting the frequency modulation components of the sound IF wave to produce the audio signal which is applied to an audio amplifier 60 prior to being fed to a loud speaker 62, for example.

Figures 2, 3, 4:
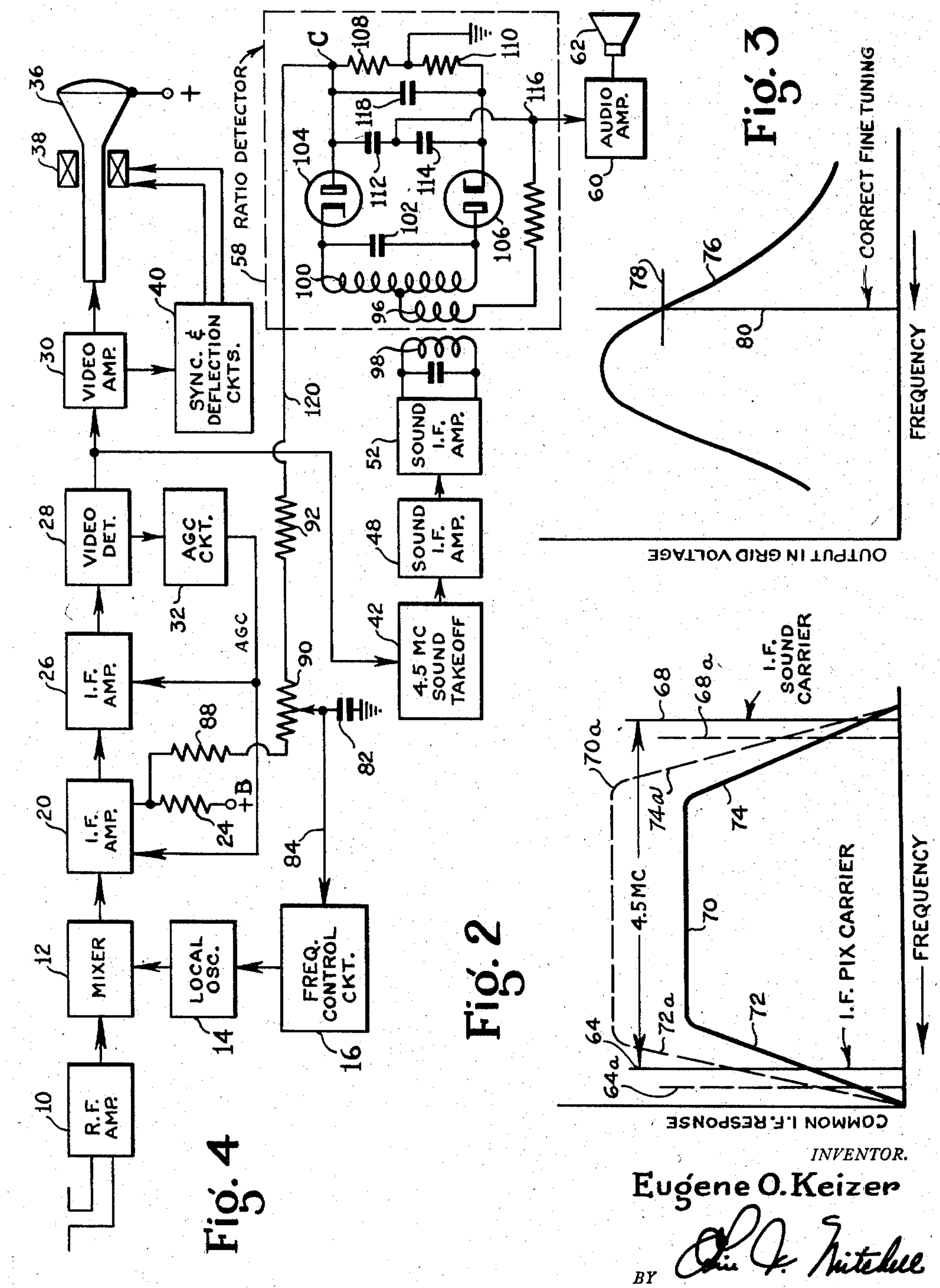
Figure 2 is an intermediate frequency response characteristic to be described in connection with the operation of the invention.
Figure 3 is a graphical illustration of the variation in grid voltage of the sound IF amplifier which is a function of local oscillator tuning.
Figure 4 illustrates another form of the invention.

As thus far described, the apparatus of Figure 1 is in accordance with well known intercarrier sound television receivers such as those currently in existence. In order that the principles of the present invention may be more fully understood, there is illustrated in Figure 2 the relationship of the video and sound carrier waves frequencies 64 and 68, respectively, in relationship to the overall response characteristic of the "common" IF amplifiers 20 and 26. These carrier wave frequencies are, as shown, spaced apart exactly 4.5 mc., in accordance with present day television standards. The response characteristic 70 is normally such that the video carrier frequency is located at the 50% amplitude point on its sloping side 72, while the sound IF carrier is at a substantially lower point on its opposite slope 74. Assuming that the frequency of the local oscillator 14 of Figure 1 varies somewhat from its desired value which may, by way of illustration, be 113 mc. and in such direction that the video carrier 64 is, in effect, moved downwardly to the location shown at **64*a* in Figure 2, it will be appreciated that the sound IF carrier wave 68, which is necessarily spaced 4.5 mc. therefrom, is similarly "moved" to a higher amplitude point such as that shown by the dotted line 68*a*. For the rather small change in frequency denoted by the moved lines 64 and 68, it would appear that the change in response for the two carrier waves is not particularly great. This, however, is found to be untrue, by reason of the fact that the receiver's automatic gain control circuits act in such manner as to "aid" the above described action. That is to say, the automatic gain control circuit 32 will experience, because of the mistuning of the local oscillator 14, the same stimulus that occurs when a weaker signal than normal is being received. Thus, the AGC circuit will apply a less negative bias to the control electrodes of the IF amplifiers 20 and 26 in order to increase their gain in such manner as to overcome or compensate for the reduction in signal strength. Such AGC action has the effect of changing the amplitude response from the solid line curve shown at 70 to the dotted line curve 70*a* which is substantially a vertical expansion of the former curve such that the video IF carrier 64*a* is located at approximately the 50% amplitude point of the slope 72. As a result of the preceding action, however, the sound IF carrier frequency 68*a* is now seen to be located at a still higher point on the new slope 74*a*** of the overall response characteristic.

This interrelated action of the tuning and AGC circuits may be translated into terms of the grid current of the final sound IF amplifier 52, as illustrated by curve 76 of Figure 3 wherein there is plotted voltage at point "A" (Figure 1) as a function of variation in fine tuning of the local oscillator 14. The correct level of such voltage is indicated by reference line 78 at the intersection of curve 76 at the line 80 which represents fine tuning of the local oscillator. More specifically, in accordance with the above explanation with respect to the showing of Figure 2, when the local oscillator 14 is mistuned in such manner that reference line 80 is moved to the left, the grid voltage reference line 78 will similarly be moved to a greater amplitude point. The result of such action is that the negative voltage at point "A" resulting from increased grid current in the amplifier 52 will be increased, thereby charging capacitor 82 in Figure 1 more negatively. This negative signal is therefore available on lead 84 for application to the frequency control circuit 16. The frequency control circuit employed does not constitute a part of the present invention and may, therefore, take any well known form, such as the reactance tube circuit shown which is described and claimed in U.S. Patent 2,544,311, granted to T. L. Gottier, March 6, 1951. In its operation, the reactance tube 17 acts as a shunt inductance to lower the frequency of the oscillator in response to an increased negative signal on lead 84 (where the local oscillator frequency is above the incoming radio frequency, as is the usual case). The oscillator shown in Figure 1 is of the well known Hartley type. Another form of frequency control means which may be employed in block 16 is the variable capacitor described and claimed in U.S. Patent 2,526,207, granted to H. L. Donley et al., October 17, 1950. Insofar as the present invention and its operation are concerned, however, it is sufficient to note that changing grid current of the final IF amplifier 52 as a function of varying tuning of a local oscillator 14 is in a predetermined direction for mistuning in a given direction. Conversely, assuming that the tuning of the local oscillator 14 is changed so that the fine tuning reference line 80 of Figure 3 is moved to the right, the voltage reference line 78 will drop to a lower amplitude. In other words, this latter mistuning will cause less grid current to flow in IF amplifier 52 with the result that the negative voltage at point "A" in its grid circuit will decrease. This decrease in voltage in point "A" will, in turn, be reflected by the discharging of capacitor 82, thereby producing a control signal on lead 84 in the opposite direction from that previously described.

As has been stated supra, the sensitivity of the signal producing means including the grid circuit of IF amplifier 52 is aided by the action of the AGC circuits of the receiver. Thus, it should be noted that, assuming a mistuning of reference line 80 to the right in Figure 3 with a resultant drop in grid current and reduced negative voltage at point "A" (in Figure 1) which corresponds to an increased amplitude response for the video signal, the AGC circuit 32 will tend to decrease the gain of the receiver IF amplifiers 20 and 26 until the video carrier is at its proper amplitude, thus effectively decreasing the error voltage signal available at point "A." This addition afforded by the AGC action to the error signal available at the grid of the IF amplifier 52 therefore aids the AFC apparatus of the present invention by making its sensitivity to mistuning extremely responsive to small changes in oscillator mistuning.

As a further addition to the action of the apparatus as thus far described, there is included a connection of lead 86 to the upper terminal of resistor 24 or some selected point therein. (As will be understood, movement of the connection downwardly toward the B+ terminal decreases the amount of signal available to lead 86.) The lead 86 includes a resistor 88 which is joined to one end of potentiometer 90, the other end of this potentiometer being connected via resistor 92 to point "A." The action of resistor 92 and potentiometer 90, as will be understood by those skilled in the art, is that of varying the amount of signal applied via lead 84 to the frequency control circuit 16 by the voltage dropping action of the resistances. The purpose of connecting lead 86 to resistor 24 may be explained as follows: since IF amplifier 20 is subject to AGC action as above described, the voltage at the junction of lead 86 and resistor 24 will vary as a function of the AGC action and in such manner that, when the AGC circuit serves to increase the gain of amplifier 20, the increased current flow through resistor 24 will render point "B" less positive than its normal potential. In terms of the automatic frequency control function of the present invention, assuming that local oscillator 14 is mistuned in such manner as to produce an increase in the voltage at point *a* (i.e. moving the reference line 80 in Figure 3 to the left), the effect on the video carrier wave frequency will be opposite thereto. In other words, the amplitude response for the video carrier will decrease. This will, in turn, cause the automatic gain control circuit 32 to increase the gain of the common IF amplifier 20 which causes a drop in its plate voltage and this drop, as reflected through resistor 88 and potentiometer 90, will be in an aid sense to the signal produced at point "A." The connection of potentiometer 90 and resistor 88 to point "B" may be employed advantageously where some compensation in tuning for weak signals is required. In accordance with another form of the invention, and in recognition of the fact that the screen voltage of amplifier 20 will also vary in proportion to its plate voltage, resistor 88 may be connected via lead 86 to the screen grid at point "B′." In this latter form the value of resistor 88 would be changed in order to compensate for the difference in voltages available at the plate and screen grid of the tube. While the connection to the plate or screen grid of the AGC controlled amplifier provides beneficial results heretofore not contemplated, satisfactory operation of the invention may be had by returning lead 86 to a point of fixed potential.

In accordance with another form of the invention and one which is well suited for use in receivers having low gain, this tuning signal voltage is derived from another point in the conventional circuitry of an intercarrier sound receiver. As stated earlier, the receiver illustrated in Figure 1 employs a ratio detector 58 for separating the sound signal from the 4.5 mc. intermediate frequency wave. Figure 4 is a block and schematic diagram of an intercarrier sound television receiver, showing the circuitry of a ratio detector in its usual environment. Those parts of the apparatus of Figure 4 which correspond to portions of Figure 1 bear the same reference numerals so that their description need not be repeated.

The theory and operation of a ratio detector are described at length in an article entitled "The Ratio Detector" by S. W. Seeley and J. Avins which appeared in the June 1947 issue of the RCA Review at page 201 et seq. Briefly, however, the ratio detector 58 includes a winding 96 which is closely coupled to inductive winding 98 in the output circuit of the final sound IF amplifier, one end of winding 96 being connected to a point intermediate the ends of a secondary winding 100. Winding 96 is less tightly coupled to winding 100 than it is to winding 98. Across winding 100 is a capacitor 102 which tunes the winding to the center frequency of 4.5 mc., in this case. The upper end of winding 100 is connected to the cathode of a diode 104 while the bottom end of that winding is connected to the anode of a second diode 106. Each diode has a load resistor 108 and 110, respectively, the junction of the load resistors being connected to ground, as illustrated. Also connected across the diodes are capacitors 112 and 114 in series with each other, the junction of the capacitors being connected to the end of winding 96 remote from the first mentioned end thereof. At the junction of winding 96 and the lead connected between capacitors 112 and 114 is the sound output terminal 116 which is, in turn, coupled to the audio amplifier 60. Connected across the load resistors 108 and 110 is a large capacitor 118 described in the Seeley et al. article as a stabilizing capacitor for rendering the ratio detector substantially unresponsive to amplitude changes of the incoming signal coupled to the detector via winding 96. While the ratio detector is, as understood by those skilled in the art, not responsive to amplitude variations in the received wave but is designed to provide across resistors 108 and 110, respectively, voltages which are in the ratio of the voltage in inductance 96 and the upper half of winding 100 to the voltage in inductance 96 and the lower half of winding 100, diodes 104 and 106 are driven harder by increased signals and less by decreased signals. That is to say, with increasing signal strength in winding 100, diodes 104 and 106 will draw more current through their serially connected load resistors 108 and 110. Conversely when the amplitude of the signal wave applied to the ratio detector decreases, the current drawn by the diodes through their load resistors will decrease. By reason of the changing diode current as a function of signal strength variation, the voltage at point "C" will also vary in the same manner. Thus, assuming an increase in signal strength, the voltage drop across resistor 108 will increase, to render point "C" in more negative than it is for normal signal strength, while a decreased signal will render point "C" less negative than normal.

In view of the foregoing, it should now be apparent that, since the tuned circuit comprising winding 100 and capacitor 102 is resonant at the 4.5 mc. beat frequency, mistuning of the local oscillator will produce a change in the strength of the signal applied to the ratio detector. More explicitly, if the local oscillator 14 is mistuned in such manner that the reference line 80 (Figure 3) is effectively moved to the right, the ratio detector will experience a drop in the amplitude of the signal applied to it, with the result that the current through the diodes 104 and 106 will decrease, thereby rendering point "C" less negative than normal.

Hence, according to this form of the invention, instead of connecting the potentiometer 90 to point "A" in the grid circuit of the final sound IF amplifier 52 as in the apparatus of Figure 1, the potentiometer is connected via lead 120 to point "C" in the ratio detector. Aside from changing the values of the resistors 92, 90 and 88 to compensate for the difference in signal produced at point "C" as opposed to that available at point "A," no further changes are necessary in the circuit and its operation is substantially the same as that described with respect to the first embodiment.

From the foregoing, those skilled in the art will recognize the fact that the present invention provides simplified automatic frequency control apparatus well suited for use in conjunction with an intercarrier sound superheterodyne television receiver, which apparatus receives signals regarding conditions of mistuning of the receiver's local oscillator from points existing in conventional circuitry. By way of summary, in accordance with one form of the invention, the signal as to mistuning is derived from the grid circuit of the final sound IF amplifier while, according to another form of the invention the signal is taken from the load resistor of the receiver's ratio detector. Both forms of the invention have in common the fact that the control signal is produced at a point in a circuit which is responsive susbtantially solely to the amplitude of a signal applied to it. Moreover, in both forms of the invention, the direction of oscillator mistuning is aided by the automatic gain control action conventionally employed in present-day television receivers.

Having thus described my invention, what I claim as new and desire to secure by Letters Patent is:

1. A receiver for translating two received carrier waves separated by a fixed frequency one of which waves is frequency modulated by intelligence signals, which receiver comprises: a first detector including a local oscillator for producing a separate intermediate frequency carrier wave corresponding to each of said received waves, said separate intermediate frequency waves being separated by said fixed frequency; frequency controlling means coupled to said oscillator and capable of varying its frequency of oscillation; mixing means for heterodyning said separate intermediate frequency waves to produce a wave frequency modulated in accordance with the frequency modulation of said one of said received carrier waves and having a center frequency equal to said fixed frequency; an electrical signal processing channel having a tuned circuit tuned to said fixed frequency; means coupling said mixing means to said channel; a ratio detector having a load resistance for demodulating said produced frequency modulated wave connected in said channel and coupled to said tuned circuit, the direct current through which load resistance varies in proportion to the amplitude of the wave passed by said tuned circuit such that a point on said load resistance varies unidirectionally in potential responsive to variations in the amplitude of a signal passed by said tuned circuit for producing a control signal proportional to such passed signal amplitude, and means coupling such point on said load resistance to said oscillator frequency controlling means whereby to vary the frequency of said oscillator as a function of the amplitude of said passed signal.

2. In an intercarrier sound television receiver adapted to receive at least two carrier waves separated by a fixed frequency one of such waves being frequency modulated by intelligence to be detected, said receiver having means for heterodyning such carrier waves with a wave produced by a local oscillator to produce corresponding intermediate frequency waves separated by said fixed frequency, amplifier means common to both such intermediate frequencies, automatic gain control means for varying the gain of said amplifier means in inverse proportion to the strength of such waves, and means for heterodyning such separate intermediate frequency waves to produce a beat frequency having a center frequency equal to said fixed frequency and being frequency modulated in accordance with the frequency modulation of said one of said carrier wave, automatic frequency control apparatus which comprises: means coupled to said oscillator for varying its frequency in response to a control signal; a signal processing channel coupled to said second-named heterodyning means and including a tuned circuit whose resonant frequency is equal to said beat frequency; said channel also including ratio detector means to derive the modulating signal therefrom coupled to said tuned circuit and having a load resistance the direct voltage across which proportional to the amplitude of a signal passed by said tuned circuit; and means for applying the direct voltage across said ratio detector load resistance to said oscillator frequency controlling means to vary the frequency of said oscillator as a function of the amplitude of such signal passed by said tuned circuit.

References Cited in the file of this patent

UNITED STATES PATENTS

| | | |
|---|---|---|
| 2,207,934 | Mountjoy | July 16, 1940 |
| 2,282,971 | Koch | May 12, 1942 |
| 2,287,925 | White | June 30, 1942 |
| 2,356,201 | Beers | Aug. 22, 1944 |
| 2,357,984 | Travis | Sept. 12, 1944 |
| 2,496,063 | Mural | Jan. 31, 1950 |
| 2,504,663 | Dome | Apr. 18, 1950 |
| 2,664,464 | Cotsworth | Dec. 29, 1953 |

OTHER REFERENCES

Rider: Television Manual, volume 2, Philco Corp. TV, pp. 2–75 and 2–76, copyrighted 1949.

Rider: Television Manual, volume 2, Philco Corp. TV, pp. 2–131 and 2-132, copyrighted 1949.